United States Patent
Himayat et al.

(10) Patent No.: US 10,104,641 B2
(45) Date of Patent: Oct. 16, 2018

(54) NETWORK SELECTION IN A HETEROGENEOUS NETWORK

(71) Applicant: INTEL IP CORPORATION, Santa Clara, CA (US)

(72) Inventors: Nageen Himayat, Fremont, CA (US); Shu-Ping Yeh, New Taipei (TW); Shilpa Talwar, Los Altos, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 278 days.

(21) Appl. No.: 14/766,728

(22) PCT Filed: Feb. 28, 2014

(86) PCT No.: PCT/US2014/019304
§ 371 (c)(1),
(2) Date: Aug. 7, 2015

(87) PCT Pub. No.: WO2014/134409
PCT Pub. Date: Sep. 4, 2014

(65) Prior Publication Data
US 2015/0373604 A1    Dec. 24, 2015

Related U.S. Application Data

(60) Provisional application No. 61/771,698, filed on Mar. 1, 2013.

(51) Int. Cl.
*H04W 36/14*    (2009.01)
*H04W 72/00*    (2009.01)
(Continued)

(52) U.S. Cl.
CPC ........ *H04W 72/005* (2013.01); *H04B 7/0452* (2013.01); *H04B 7/0486* (2013.01);
(Continued)

(58) Field of Classification Search
CPC .............................. H04W 84/12; H04W 84/18
See application file for complete search history.

(56) References Cited

U.S. PATENT DOCUMENTS 7,068,683 B1 * 6/2006 Lundby ................. H04L 1/0002
370/329
2002/0101632 A1 * 8/2002 Meckler ............. H04B 10/1125
398/43
(Continued)

FOREIGN PATENT DOCUMENTS

CN    101647310 A    2/2010
KR    2012-0047451    5/2012
(Continued)

OTHER PUBLICATIONS

S. Talwar, S. Yeh, N. Himayat, K. Johnsson, G.Wu, R. Hu, "Capacity and Coverage Enhancement in Heterogeneous Networks," Book chapter submitted, Dec. 2011.
(Continued)

*Primary Examiner* — Zhiren Qin
(74) *Attorney, Agent, or Firm* — Thorpe North & Western LLP

(57) ABSTRACT

A technology for a user equipment (UE) in a multiple radio access technology (multi-RAT) heterogeneous network (HetNet) that is operable to receive node-selection pricing information from a plurality of nodes in the multi-RAT HetNet. Effective normalized rate can be determined for the plurality of nodes in the multi-RAT HetNet using the node-selection pricing information. A node can be selected to communicate with in the multi-RAT HetNet to maximize a selected preference based on the effective normalized rate.

12 Claims, 12 Drawing Sheets

(51) Int. Cl.

| | | |
|---|---|---|
| H04B 7/0456 | (2017.01) | |
| H04B 7/0452 | (2017.01) | |
| H04W 36/22 | (2009.01) | |
| H04L 5/00 | (2006.01) | |
| H04L 12/741 | (2013.01) | |
| H04B 7/06 | (2006.01) | |
| H04W 24/10 | (2009.01) | |
| H04W 72/04 | (2009.01) | |
| H04W 72/08 | (2009.01) | |
| H04L 29/06 | (2006.01) | |
| H04L 29/08 | (2006.01) | |
| H04W 4/10 | (2009.01) | |
| H04W 12/02 | (2009.01) | |
| H04W 12/04 | (2009.01) | |
| H04W 24/02 | (2009.01) | |
| H04W 24/08 | (2009.01) | |
| H04L 12/18 | (2006.01) | |
| H04W 52/24 | (2009.01) | |
| H04W 72/10 | (2009.01) | |
| H04W 16/14 | (2009.01) | |
| H04W 36/16 | (2009.01) | |
| H04W 36/30 | (2009.01) | |
| H04J 3/12 | (2006.01) | |
| H04W 48/10 | (2009.01) | |
| H04W 48/20 | (2009.01) | |
| H04M 15/00 | (2006.01) | |
| H04L 25/03 | (2006.01) | |
| H04W 4/80 | (2018.01) | |
| H04W 4/00 | (2018.01) | |
| H04W 88/06 | (2009.01) | |
| H04W 88/02 | (2009.01) | |
| H04W 88/08 | (2009.01) | |
| H04W 84/18 | (2009.01) | |
| H04W 4/06 | (2009.01) | |

(52) U.S. Cl.
CPC .............. *H04B 7/0626* (2013.01); *H04J 3/12* (2013.01); *H04L 5/0037* (2013.01); *H04L 12/184* (2013.01); *H04L 25/03* (2013.01); *H04L 45/74* (2013.01); *H04L 65/4038* (2013.01); *H04L 65/608* (2013.01); *H04L 65/80* (2013.01); *H04L 67/02* (2013.01); *H04M 15/8044* (2013.01); *H04W 4/10* (2013.01); *H04W 12/02* (2013.01); *H04W 12/04* (2013.01); *H04W 16/14* (2013.01); *H04W 24/02* (2013.01); *H04W 24/08* (2013.01); *H04W 24/10* (2013.01); *H04W 36/14* (2013.01); *H04W 36/165* (2013.01); *H04W 36/22* (2013.01); *H04W 36/30* (2013.01); *H04W 48/10* (2013.01); *H04W 48/20* (2013.01); *H04W 52/244* (2013.01); *H04W 72/044* (2013.01); *H04W 72/0406* (2013.01); *H04W 72/085* (2013.01); *H04W 72/087* (2013.01); *H04W 72/10* (2013.01); *H04W 4/008* (2013.01); *H04W 4/06* (2013.01); *H04W 4/80* (2018.02); *H04W 84/18* (2013.01); *H04W 88/02* (2013.01); *H04W 88/06* (2013.01); *H04W 88/08* (2013.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/23* (2018.01); *Y02D 70/26* (2018.01); *Y02D 70/444* (2018.01)

(56) References Cited

U.S. PATENT DOCUMENTS

| | | |
|---|---|---|
| 2004/0131078 A1 | 7/2004 | Gupta |
| 2006/0030319 A1 | 2/2006 | Chou |
| 2006/0092890 A1 | 5/2006 | Gupta |
| 2008/0137613 A1 | 6/2008 | Berg |
| 2012/0214497 A1* | 8/2012 | Shin ................. H04W 16/32 455/449 |
| 2012/0257664 A1* | 10/2012 | Yue .................... H04B 7/0452 375/227 |
| 2013/0329639 A1* | 12/2013 | Wietfeldt .............. H04W 88/06 370/328 |
| 2014/0185519 A1* | 7/2014 | Zhang ................. H04W 40/248 370/328 |

FOREIGN PATENT DOCUMENTS

| | | |
|---|---|---|
| WO | WO 2013/101135 | 7/2013 |
| WO | WO 2013/112189 | 8/2013 |

OTHER PUBLICATIONS

3GPP RWS-120010, "Requirements, Candidate Solutions & Technology Roadmap for LTE Rel-12 onward," NTT-DOCOMO, Jun. 2012.

E. Aryafar, A. Haddad, M. Wang, and M. Chiang "RAT Selection Games in Het-Nets," to appear in the Proceedings of the IEEE INFOCOM-2013, Apr. 2013.

Toshiba America Research et al: "Access Networks Discovery Discussion Paper", 3GPP Draft; S2-070865, St. Louis, USA; 20070212-20070215, Feb. 7, 2007 (Feb. 7, 2007), XP050627165, [retrieved on Feb. 7, 2007] *paragraphs [004.]-[005.]; figures 1a, 2, 3.

* cited by examiner

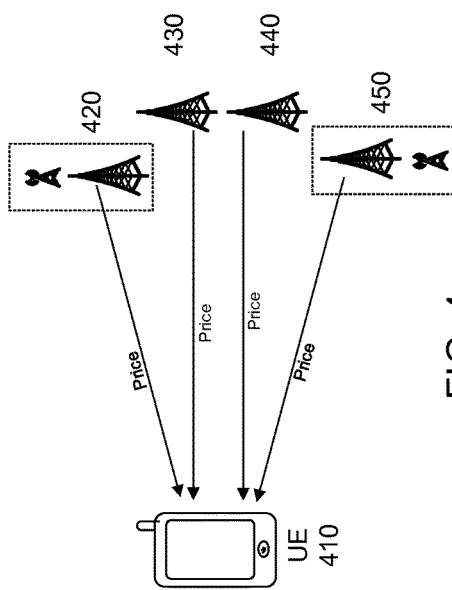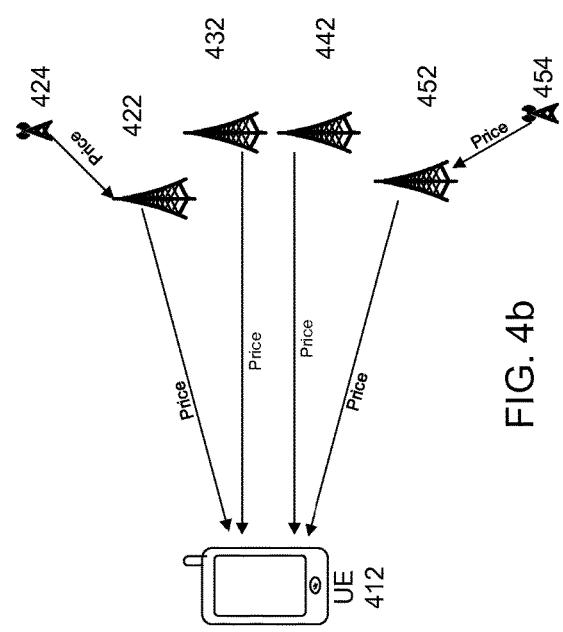
FIG. 4a
FIG. 4b

NETWORK SELECTION IN A HETEROGENEOUS NETWORK

RELATED APPLICATIONS

This application claims the benefit of and hereby incorporates by reference U.S. Provisional Patent Application Ser. No. 61/771,698, filed Mar. 1, 2013.

BACKGROUND

Moore's Law has allowed processors in mobile devices to be used for ever more complex processing, such as the processing of full motion video for display on mobile devices. However, while Moore's Law enables the processor to exponentially increase in processing power, the same is not true in the transmission of data. The transmission of full motion video requires thousands of times more data than the transmission of text, or even voice. Each transmitted bit still takes approximately the same amount of power to transmit and receive. In addition, the available bandwidth for data communication has remained relatively fixed. In order to accommodate the large increase in data transmission, the efficient use of the available radio network resources is important. To handle the increasing amount of wireless services and data transmission for an increasing numbers of users, efficient use of the available radio network resources has become important.

In homogeneous networks, the transmission station, also referred to as a macro node, can provide basic wireless coverage to mobile devices over a broad geographical area by transmitting a relatively high power signal. However, the geographical area can still have areas in which wireless communication is slow or difficult, due to high use, changes in geography, large buildings, and so forth. Heterogeneous networks (HetNets) were introduced to compensate for areas in which communication was slow or nonexistent and to reduce increased traffic loads on the macro node due to increased usage and functionality of mobile devices. HetNets can include a layer of planned high power macro nodes or macro evolved node Bs (eNode Bs) overlaid with layers of lower power nodes (micro-nodes, pico-nodes, femto-nodes, home-nodes, relay stations, etc. . . . ) that can be deployed in a less well planned or even entirely uncoordinated manner within the coverage area of the macro nodes. The macro nodes can be used for basic coverage, and the low power nodes can be used to fill coverage holes, to improve capacity in hot-zones or at the boundaries between the macro nodes' coverage areas, and improve indoor coverage where building structures impede signal transmission.

However, even with a targeted deployment of lower power nodes, most users will still receive a stronger signal or have a greater downlink capacity from the relatively high power signal of the macro-node. For a more balanced use of nodes in a HetNet, such as to balance the traffic load for a given node, user equipment (UE) association with selected nodes can reduce the load on nodes such as macro nodes, allowing for users to be better served.

Several approaches to node association and radio access technology (RAT) selection have emerged for different embodiments of multiple radio access technology (multi-RAT) HetNet architectures to better distribute traffic across the overall network. A multi-RAT HetNet architecture is a HetNet that includes multiple nodes that support different types of radio access technologies. The RATs may operate in licensed and/or unlicensed bands. A multi-RAT HetNet can support licensed band technologies, such as 3rd Generation Partnership Project (3GPP) technologies, and unlicensed band technologies, such as Institute of Electronics and Electrical Engineers (IEEE) 802.11 WiFi technologies. Additional types of licensed and unlicensed bands can also be supported, as discussed in the proceeding paragraphs.

Node-range extensions schemes have been designed to work with single-RAT HetNets, wherein signal to noise ratio (SNR) based node association schemes are extended to steer traffic away from macro nodes to small nodes. Node associations which have been designed for HetNets incorporating multiple RATs were typically developed to account for Quality of Service (QoS) in node-association. Other load balancing techniques have been designed for multi-RAT HetNets. Network controlled node-selection and assignment mechanisms for integrated multi-RAT HetNets, which optimize loading across multiple RATs of an integrated small nodes have been developed. Centralized solutions for node-association and RAT selection for macro assisted HetNets have also been designed. Fully distributed UE centric schemes have been designed wherein RAT selection is performed without any help from the network.

Additionally, network cooperation is very limited in availability and feasibility for these designs. For example, planned operator deployments for multi-RAT HetNets include distributed deployments wherein the access points (APs) or eNode Bs are not necessarily co-located and no direct network interface exists between them, e.g. no network interface exists between the third generation partnership project (3GPP) nodes and the wireless local area network (WLAN) APs. Furthermore UE assistance creates overhead associated for these schemes.

Each node selection scheme has a distinct approach to signal network assistance information and employ different methods by which such information is used by UEs in their network selection decisions. Additionally, the performances of these designs deviate substantially from the optimal solution available with full network cooperation. Furthermore, with all the variations in the designs it has become cumbersome for a UE to incorporate and/or use the information from the different designs.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4a illustrates a co-located HetNet and WLAN nodes in accordance with an example;

FIG. 4b illustrates HetNet nodes adjacent to WLAN nodes in accordance with an example;

Figure 1:
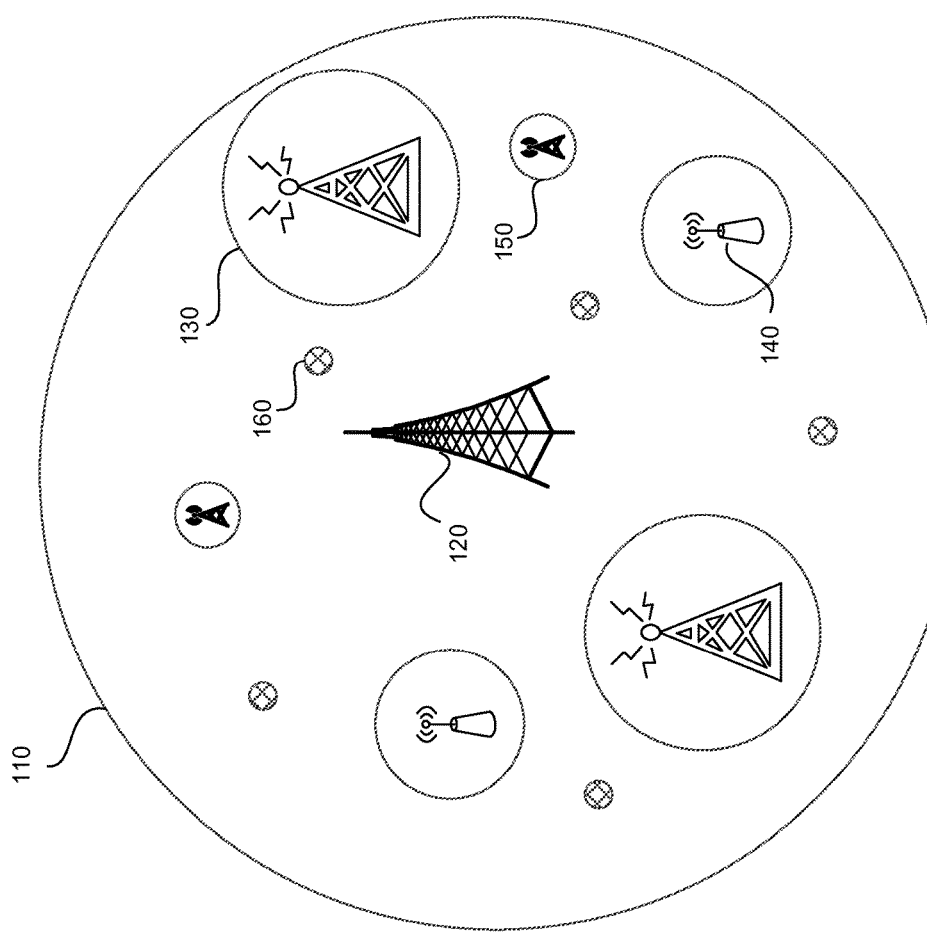
FIG. 1 depicts a multi-RAT HetNet with a macro cell overlaid with layers of lower power nodes in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Increased cooperation in the network is able to provide improved network assistance information that can steer the user equipment (UEs) towards a decision that maximizes a system centric metric such as sum throughput or proportional fair throughput per node/per service area. A centralized and cooperative node association design can yield simple network assistance information that drives optimal results for a UE-based network selection schemes. UE centric schemes can be desirable as the UE can factor user preferences in its radio access technology (RAT) selection decisions. The signaling overhead in communicating the assignment decisions can also be reduced substantially.

Additionally, a common framework for network assisted UE-centric node-association/RAT selection, which can be consistently applied across the various multi-RAT HetNet scenarios and that scales, provides improved performance as the level of cooperation in the network increases. One embodiment of this framework is using pricing based network selection in a multi-RAT HetNet. FIG. 1 depicts a multi-RAT HetNet with a macro-cell 110 and a macro-node 120 overlaid with layers of lower power nodes including micro-nodes 130, pico-nodes 140, femto-nodes 150, and WiFi access points (APs) 160. While the multi-RAT HetNet architecture is illustrated using third generation partnership project (3GPP) technology for communication in licensed portions of the radio spectrum, and Institute of Electronics and Electrical Engineers (IEEE) 802.11 WiFi technology for communication in unlicensed portions of the radio spectrum, this is not intended to be limiting. Other types of licensed and unlicensed technologies may also be used, such as Bluetooth, Zigbee, near field communication (NFC), and other communications technologies.

In one embodiment of a multi-RAT HetNet architecture, the architecture includes integrated multi-RAT small nodes, where a multiple radio interface such as WiFi and 3GPP are integrated as part of a single infrastructure device. In another embodiment, the multi-RAT HetNet architecture includes an increased level of cooperation between infrastructure nodes or nodes and UEs.

Figure 2A:
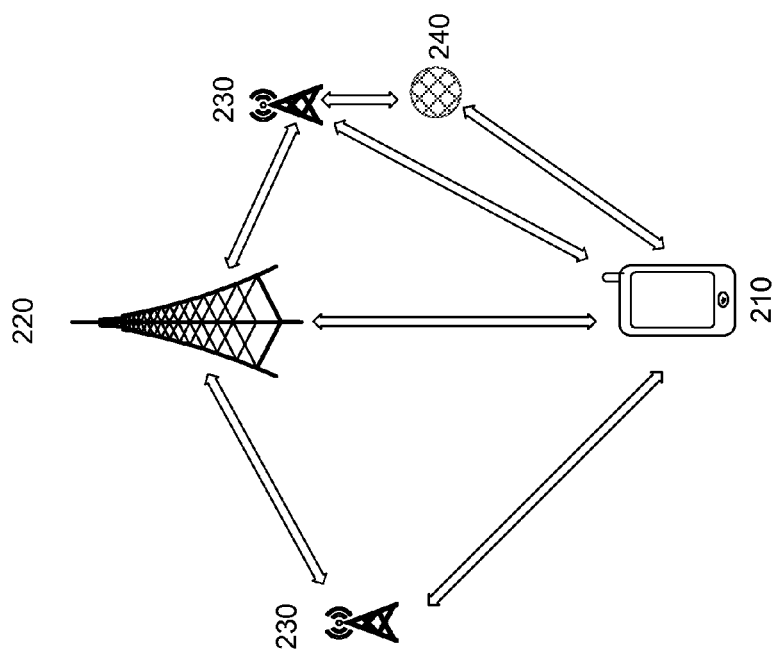
FIG. 2a depicts a cooperative network in accordance with an example.

FIG. 2*a* illustrates one example of a cooperative network. In FIG. 2 the UE 210 is in communication with multiple nodes including a macro-node 220, multiple femto-nodes 230, and a WiFi AP 240. In one embodiment, different node types may be in communication with each other, aid in computations, and share information. FIG. 2 further depicts that the macro-node 220, multiple femto-nodes 230, and WiFi AP 240 are also in communication with each other as well as the UE 210. In another embodiment, the multi-RAT HetNet architecture includes a centralized architecture where a wide area of macro networks provide the control link to manage devices and support mobility functions and the macro networks utilize the tier of smaller nodes for high-data rate transmission.

In one embodiment, a pricing based network selection framework can unify network assistance information across the various multi-RAT HetNet deployments, such as distributed, integrated and macro-assisted multi-RAT HetNets. The pricing information may be computed across different types of networks and in various situations to provide an improved level of performance with increasing cooperation in the network. In one embodiment, RAN level pricing mechanisms are used. In another embodiment, the pricing information may be provided by a core network.

Figure 2B:
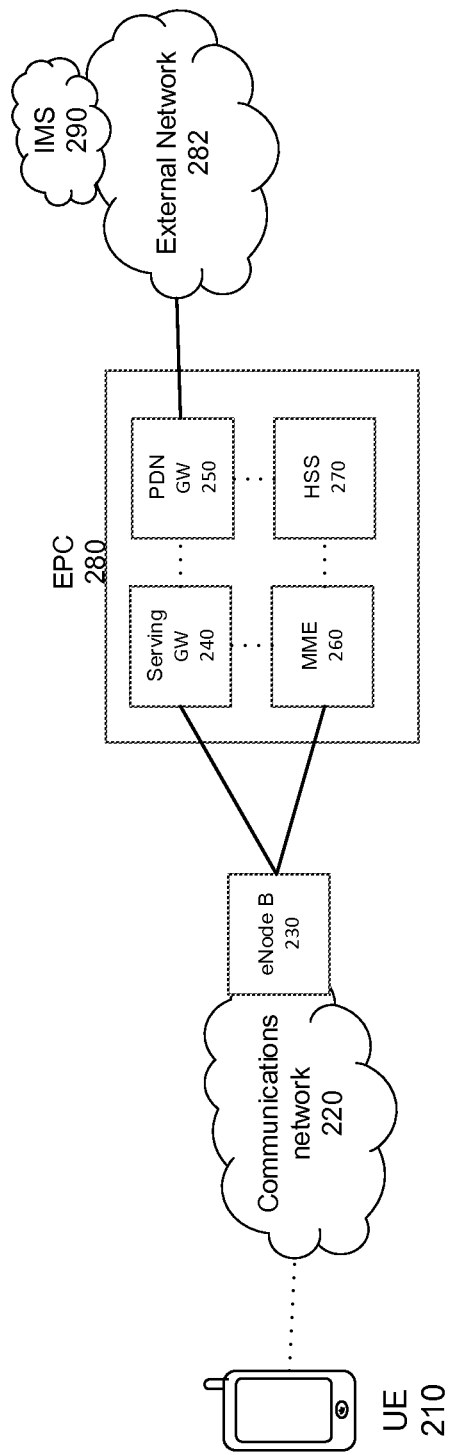
FIG. 2b shows a core network in accordance with an example.

FIG. 2*b* shows one exemplary embodiment of a core network, such as an evolved packet core (EPC) 280. FIG. 2*b* further shows a UE 210 connected to the EPC 280 over a communications network 220, such as a cellular network. An eNode B 230 can be a base station in the communications network 220. The eNode B 230 can be in communication with the EPC 280. The EPC 280 can include one or more network elements, such as a serving gateway (Serving GW) 240, a packet data network Gateway (PDN GW) 250, a mobility management entity (MME) 260, and a home subscriber server (HSS) 270. The EPC 280 can be connected to an external network 282 via the PDN GW. In one embodiment, the external network 282 can include an internet protocol (IP) multimedia core network subsystem (IMS) 290. A UE in communication with a multi-RAT HetNet, such as the macro-cell 110 illustrated in FIG. 1, can communicate with an external network 282 via a core network, such as the EPC 280.

The HSS 270 can be a database that contains user-related and/or subscriber-related information of the EPC 280.

The Serving GW 240 and PDN GW 250 can communicate data traffic between the UE 210 and the external network 282. The Serving GW 240 can communicate data packets between the UE 210 and the EPC 280. The PDN GW 250 can be in communication with the Serving GW 240. The PDN GW 250 can receive data from the Serving GW 240 and communicate the data to the external network 282.

The MME 260 can track the UE 210 and page the UE 210 when the UE 210 is in an idle-mode, among other tasks.

The network pricing framework can serve as a unifying method for node, RAT, or node selection in both distributed and fully centralized multi-RAT HetNets. The pricing framework may be used for all types of nodes, such as a 3GPP macro node (eNode B), a 3GPP small node, an integrated multi-RAT small node, or a WLAN access point. In one embodiment, the network pricing framework can be managed by nodes in a 3GPP network. In another embodiment, the network pricing framework for a multi-RAT UE may logically associate with both a 3GPP network and an unlicensed spectrum technology, such as a WLAN node or cell. In one embodiment, if a UE decides to use a WLAN node or cell exclusively for data traffic, the UE may still maintain idle mode association with an optimal 3GPP node.

Figure 3:
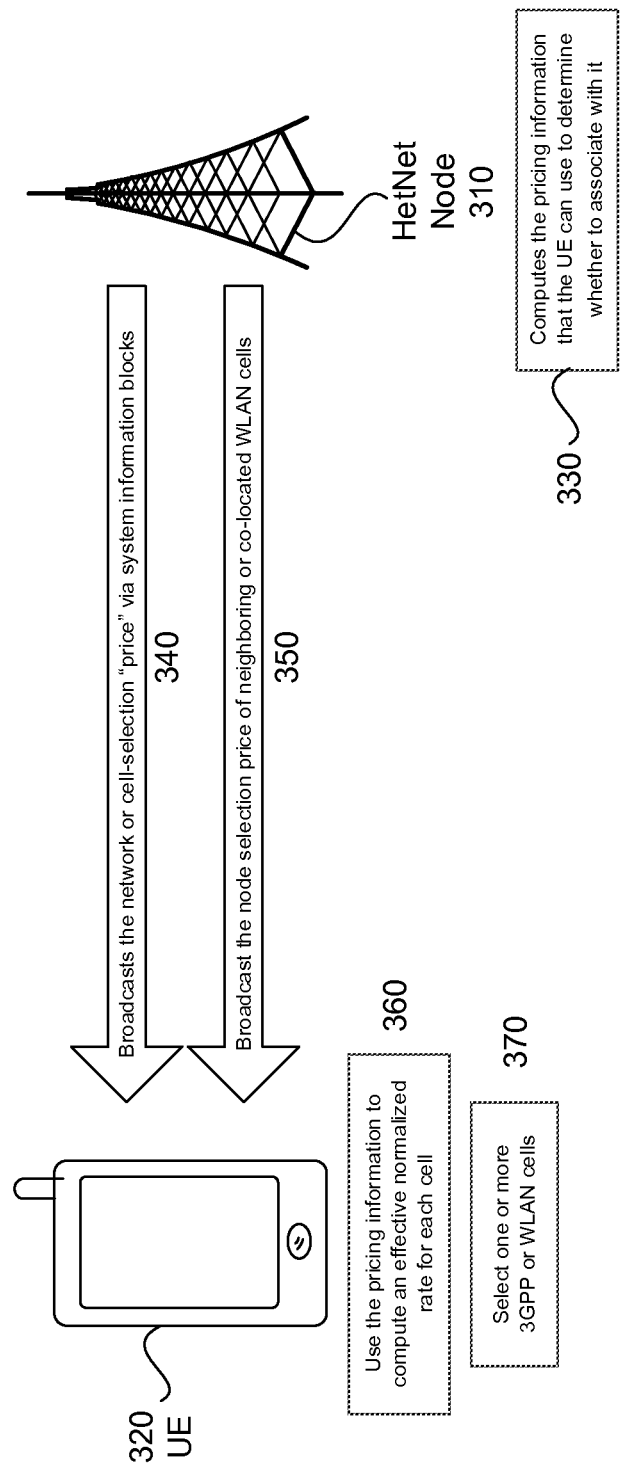
FIG. 3 depicts a network pricing framework in accordance with an example.

FIG. 3 depicts one embodiment of the network pricing framework. In FIG. 3, a HetNet node 310 is configured to compute 330 the pricing information that a UE 320 can use to determine whether to associate with the HetNet node. In one embodiment, the pricing information is computed independently of other nodes, cells, or a centralized controlling entity. In another embodiment, the pricing information is computed using the full or partial cooperation of other nodes, cells, or a centralized controlling entity. The HetNet node 310 can then broadcast the network or node selection price to the UE. For example, the node selection price can be broadcast using system information blocks 340 or through another broadcast or unicast means, such as radio resource control (RRC) signaling. In one embodiment, the HetNet node 310 can also broadcast the node selection price of neighboring, adjacent or co-located WLAN nodes to the UE 320. The node selection price of the neighboring, adjacent, or co-located WLAN nodes can be communicated to the HetNet node via proprietary network level cooperation 350 or via a node to node connection, such as an X2 interface.

FIG. 4a shows an example of co-located HetNet and WLAN nodes 420 and 450, while HetNet nodes 430 and 440 have no co-located WLAN nodes. FIG. 4a further depicts the HetNet nodes of the co-located HetNet and WLAN nodes 420 and 450 are configured to communicate the network selection price to the UE 410. FIG. 4b shows an example of HetNet nodes 422 and 452 adjacent to WLAN nodes 424 and 454, respectively, while HetNet nodes 432 and 442 have no adjacent WLAN nodes. FIG. 4b further depicts the HetNet nodes 422 and 452 receive the network selection price from the WLAN nodes 424 and 454 and communicate both the HetNet nodes 422 and 452 network selection price and the WLAN nodes 424 and 454 network selection price, respectively, to the UE 412.

In another embodiment, the HetNet node 310, illustrated in the example of FIG. 3, can broadcast the node selection price using UE assisted information collection on neighboring or adjacent WLAN APs. The UE 320 uses the node selection pricing to compute an effective normalized rate for each node or cell in its vicinity 360. In one embodiment, the UE 320 can combine the effective normalized rate with other metrics capturing UE 320 preferences and utility and/or operator preferences. In one embodiment, the effective normalized rate is determined or optimized for a utility or preference of a network or node as a whole based on network selection price information which includes both the UE preference and the operator preference. For example, a UE may set node proximity and transmission link quality as its highest preferences while a node proximate the UE is overloaded. In this example, the network selection price information is adjusted to account for the node overload and to reflect a higher price, e.g. a less optimal node for the UE to form a connection with. In one embodiment, the effective normalized rate is determined or optimized for a utility or preference of a network or node and the UE combined based on network selection price information.

In one embodiment, the UE 320 may compute a normalized rate as a function of signal to noise ratio (SNR) or signal to interference plus noise ratio (SINR), e.g.

$$R_{eff} = \frac{R(SNR)}{Price},$$

where $R_{eff}$ is the effective normalized rate, R (SNR) is a function of a signal to noise ratio (SNR), and Price represents the node-selection pricing information. The UE 320 may select one or more HetNet nodes 310, such as 3GPP or WLAN nodes or other nodes based on the pricing information 370.

In one embodiment, the UE 320 can select the HetNet node 310 to maximize its overall transmission rates or uplink and/or downlink rates. In another embodiment, the UE 320 can select one or more HetNet nodes 310 to maximize its overall utility. The UE may compute the net or overall utility as a function of the network selection price to make RAT selection decisions, e.g. $U_{eff}=f(u_{user}, u_{operator},$ Network price), where $U_{eff}$ is the effective utility, $u_{user}$ is a utility to a user, $u_{operator}$ is a utility to an operator, and Network Price is the node-selection pricing information. The utilities can comprise a network rate, a user quality of service (QOS), a power level, a delay rate, etc.

Figure 5A:
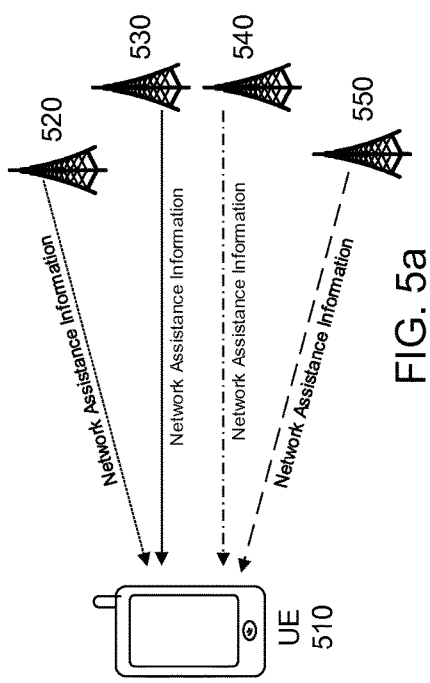
FIG. 5a shows a non-standardized system where each node communicates different types of network assistance information to a UE in accordance with an example.
Figure 5B:
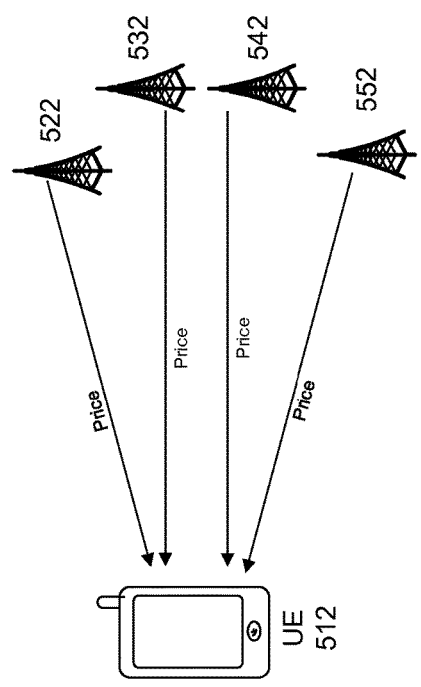
FIG. 5b shows a standardized system where each node communicates standardized network selection pricing information to a UE in accordance with an example.

The network selection pricing may be computed across different multi-RAT architectures with different levels of cooperation. Additionally, the network selection pricing may be computed to provide the UE with a standardized pricing scheme across different architectures, scenarios, and HetNet nodes. FIG. 5a shows an example of a non-standardized system where each node 520-550 communicates different types network assistance information to a UE 510 for the UE to use in determining node selection. The communicated network assistance information of FIG. 5a is not standardized, as each node sends different network assistance information. FIG. 5b shows one example of a standardized system where each node 522-552 communicates to the UE pricing information, where the pricing information is a standardized information structure. The standardized pricing allows the UE to interpret the network selection pricing information consistently across the different architectures, scenarios, and HetNet nodes. In one embodiment, a RAT or node selection may be improved with increased cooperation in a network. In one embodiment, RAT or node selection is performed in a manner which is transparent to the air interface and UE implementations. In one example, the same framework can be reused across a distributed multi-RAT HetNet deployment and an integrated multi-RAT HetNet deployment, while improved performance may be obtained when used with the integrated architecture, without changing the signaling or UE implementation.

Figure 6:
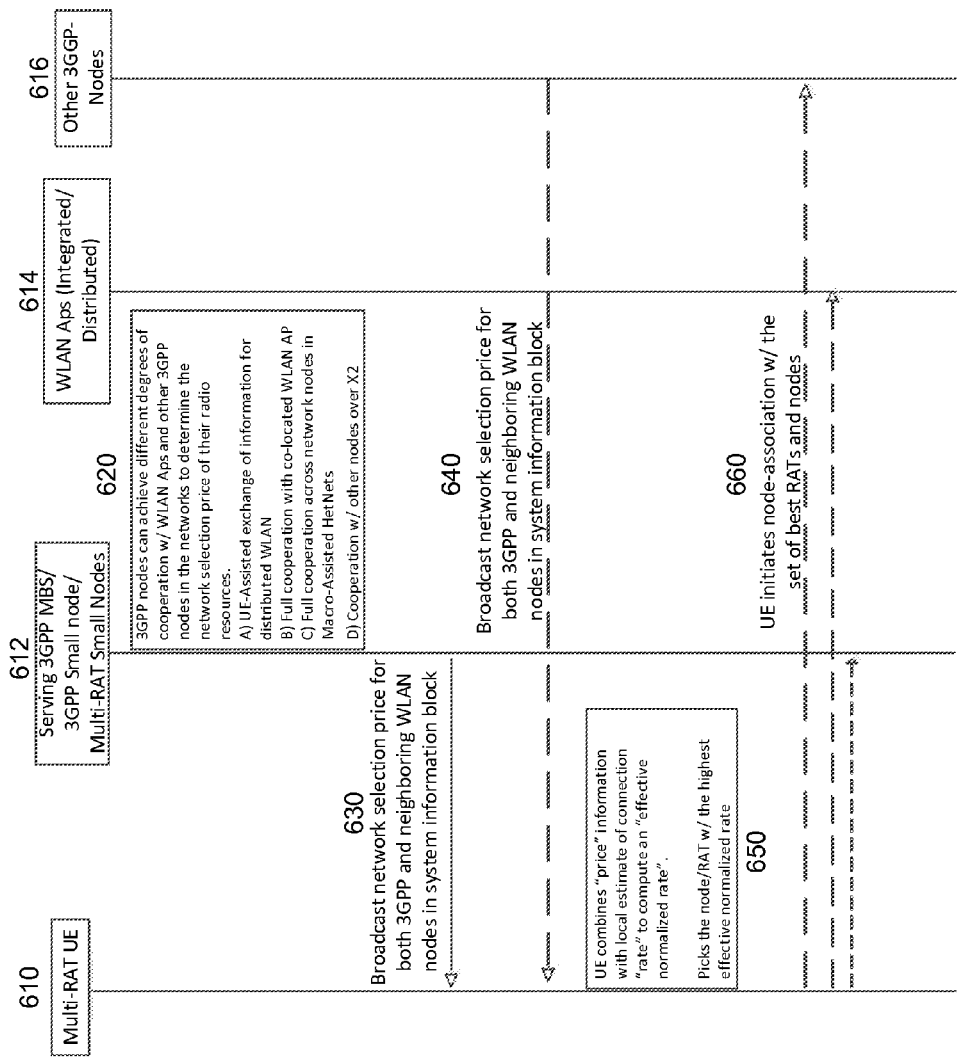
FIG. 6 illustrates the basic network pricing framework in accordance with an example.

FIG. 6 illustrates a basic mechanism to apply the network pricing framework. Additionally, block 620 of FIG. 6 shows different degrees of cooperation of a node with WLAN AP or other 3GPP nodes. For example, Serving 3GPP mobile broadband services (MBS), 3GPP Small nodes, and/or Multi-RAT Small nodes 612 can achieve different degrees of cooperation with WLAN Aps and other 3GPP nodes in the networks to determine the network selection price of their radio resources. One degree of node cooperation is a UE-Assisted exchange of information for a distributed WLAN. Another degree of node cooperation is full cooperation with a co-located WLAN AP. Another degree of node cooperation is full cooperation across network nodes in macro-assisted HetNets. Another degree of node cooperation is cooperation with other nodes over an interface, such as an LTE Radio Access X2 interface.

FIG. 6 further depicts that Serving 3GPP MBS/3GPP Small node/Multi-RAT Small nodes 612 can broadcast a network selection price for both 3GPP and neighboring WLAN nodes in a system information block 630 to a multi-RAT UE 610. Other types of broadcast or unicast communication can also be used. FIG. 6 additionally depicts, other 3GGP nodes 316 broadcasting network selection prices for both 3GPP and neighboring or adjacent WLAN nodes in a system information block 640. The multi-RAT UE 610 then combines the network selection price information with a local estimate of a connection rate with each node to compute an effective normalized rate 650. The multi-RAT UE 610 can then initiate node-association with the set of best RATs and nodes 660 based on the effective normalized rate.

Figure 7:
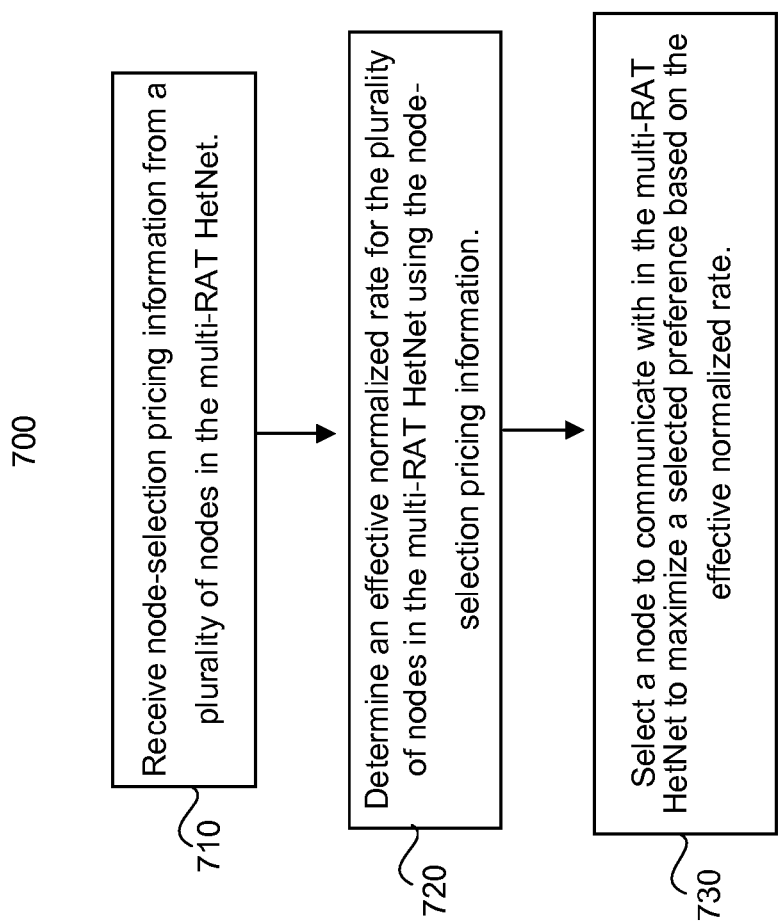
FIG. 7 depicts the functionality of the computer circuitry of a UE operable to select a node in a multi-RAT HetNet in accordance with an example.

FIG. 7 provides a flow chart 700 to illustrate the functionality of one embodiment of the computer circuitry with a UE operable to select a node in a multi-RAT HetNet. The functionality may be implemented as a method or the functionality may be executed as instructions on a machine, where the instructions are included on at least one computer readable medium or one non-transitory machine readable storage medium. The computer circuitry can be configured to receive node-selection pricing information from a plurality of nodes in the multi-RAT HetNet, as in block 710. The computer circuitry can be further configured to determine an effective normalized rate for the plurality of nodes in the multi-RAT HetNet using the node-selection pricing information, as in block 720. The computer circuitry can also be configured to select a node to communicate with in the multi-RAT HetNet to maximize a selected preference based on the effective normalized rate, as in block 730.

In one embodiment, the selected preference is a data transmission rate for the UE to communicate with the selected node in the multi-RAT HetNet. The selected preference can include one of an effective data rate, a delay, a power level, a throughput, a quality of service, a power efficiency, a data transmission rate for the UE to communicate with the selected node in the multi-RAT HetNet. In another embodiment, the selected preference is computed as a function of the node-selection pricing information. In another embodiment, the selected preference is an effective utility that is represented by $U_{eff}=f(u_{user}, u_{operator}, \text{Network price})$, where $U_{eff}$ is the effective utility, $u_{user}$ is a utility to a user, $u_{operator}$ is a utility to an operator, and Network Price is the node-selection pricing information.

Figure 8:
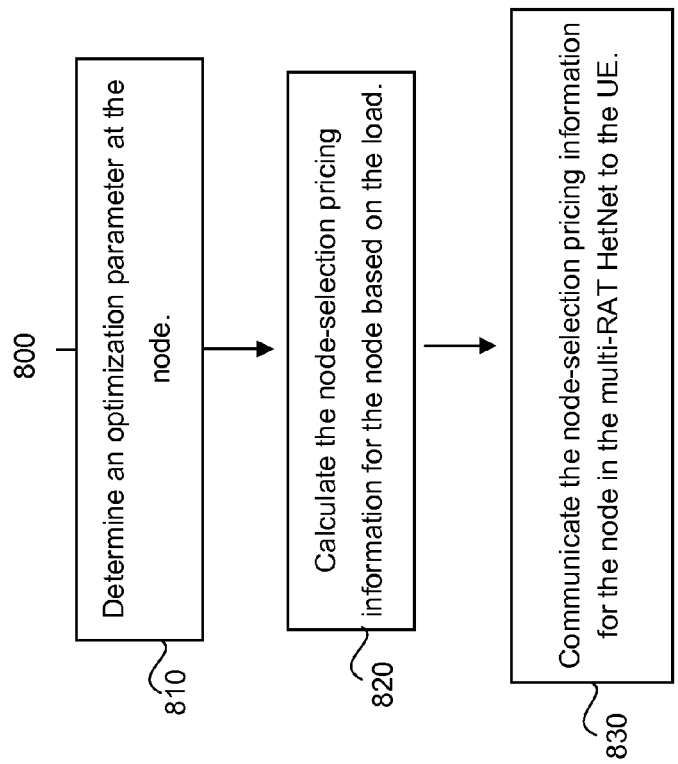
FIG. 8 depicts the functionality of the computer circuitry of a node in a multi-RAT HetNet that is operable to provide node-selection pricing information to a UE in accordance with an example.

FIG. 8 provides a flow chart 800 to illustrate the functionality of one embodiment of the computer circuitry of a node in a multi-RAT HetNet that is operable to provide node-selection pricing information to a UE. The functionality may be implemented as a method or the functionality may be executed as instructions on a machine, where the instructions are included on at least one computer readable medium or one non-transitory machine readable storage medium. The computer circuitry can be configured to determine an optimization parameter at the node, as in block 810. The computer circuitry can be further configured to calculate the node-selection pricing information for the node based on the optimization parameter, as in block 820. In one embodiment, the optimization parameter is a load at the node. The computer circuitry can also be configured to communicate the node-selection pricing information for the node in the multi-RAT HetNet to the UE, as in block 830. In one embodiment, the multi-RAT HetNet comprises one or more cellular network nodes and one or more Institute of Electrical and Electronics Engineers (IEEE) 802.11-2012 configured access points. In one embodiment, the one or more cellular network may be 3GPP LTE Rel. 8, 9, 10, 11, or 12 networks and/or IEEE 802.16p, 802.16n, 802.16m-2011, 802.16h-2010, 802.16j-2009, 802.16-2009. In one embodiment, the RATs used may include multiple different RATs, such as 3GPP RATs, WLAN RATs, mm-wave RATs, D2D RATs, 60 GHz RATs, IEEE 802.15 RATs, etc.

In one embodiment, the computer circuitry can be configured to compute the node-selection pricing information for a plurality of nodes in the multi-RAT HetNet for node selection by the UE. In one embodiment, the computer circuitry may be configured to receive the node-selection pricing information for a plurality of nodes in the multi-RAT HetNet for node selection by the UE. In one embodiment, a macro-node may receive pricing information from the network, wherein each node reports pricing information to the network. In another embodiment, each node communicates its pricing information to a macro-node via wired or wireless communications.

In one embodiment, the computer circuitry of a node in a multi-RAT HetNet can configured to communicate the node-selection pricing information of the plurality of nodes in the multi-RAT HetNet from the node to the UE to enable the UE to select a node in the multi-RAT HetNet. In another embodiment, the node-selection pricing information is broadcast from the node to a plurality of UEs using a system information block (SIB). In another embodiment, the node-selection pricing information can be determined through full or partial cooperation with other nodes in the multi-RAT HetNet or a centralized controlling entity. In one embodiment, the node can be a third generation partnership project (3GPP) long term evolution (LTE) enhanced Node B (eNode B) that is integrated with a plurality of institute of electronics and electrical engineers (IEEE) 802.11-2012 access points or adjacent to a plurality of non-integrated IEEE 802.11-2012 access points. The centralized controlling entity may be a core network in a 3GPP LTE network, such as a 3GPP LTE Rel. 8, 9, 10, 11, or 12 networks and/or IEEE 802.16p, 802.16n, 802.16m-2011, 802.16h-2010, 802.16j-2009, 802.16-2009. In another embodiment, a node is integrated with one or more nodes having a different RAT. In another embodiment, the node is a third generation partnership project (3GPP) long term evolution (LTE) enhanced Node B (eNode B) that is integrated with a plurality of institute of electronics and electrical engineers (IEEE) 802.11-2012 access points or adjacent to a plurality of non-integrated IEEE 802.11-2012 access points.

Figure 9:
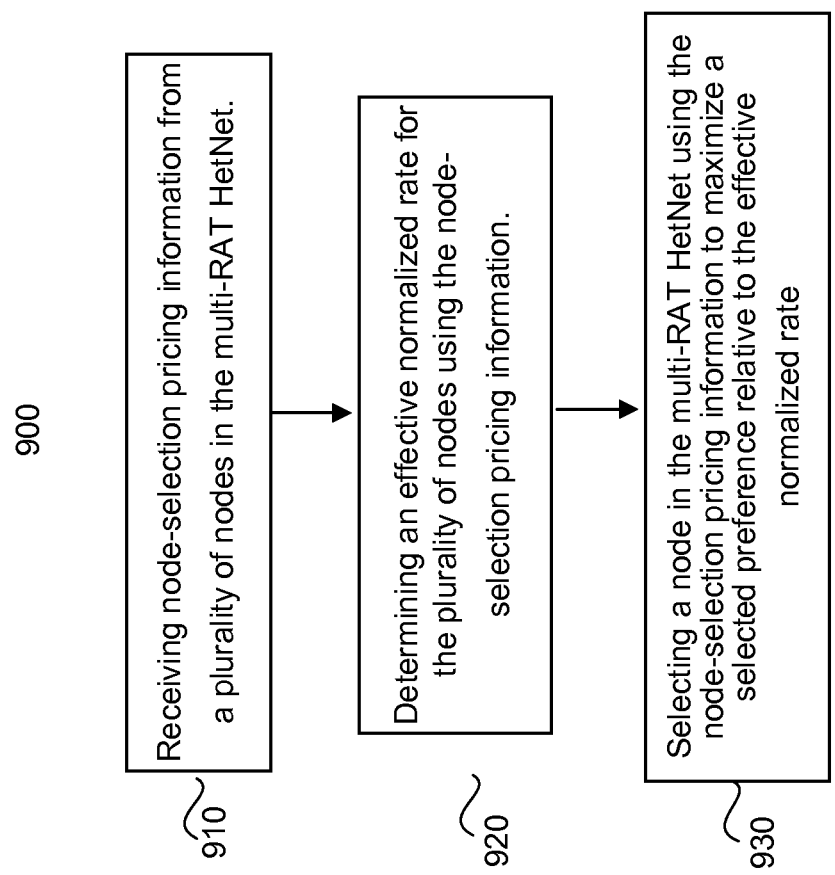
FIG. 9 illustrates a method for a UE selecting a HetNet node in a multi-RAT HetNet in accordance with an example.

Another example provides a method 900 for a UE selecting a HetNet node in a multi-RAT HetNet, as shown in the flow chart in FIG. 9. The method includes the operation of receiving node-selection pricing information from a plurality of nodes in the multi-RAT HetNet, as in block 910. The method also includes the operation of determining an effective normalized rate for the plurality of nodes using the node-selection pricing information, as in block 920. The method also includes the operation of selecting a node in the multi-RAT HetNet using the node-selection pricing information to maximize a selected preference relative to the effective normalized rate, as in block 930.

In one embodiment, the effective normalized rate is a function of a signal to noise ratio (SNR) or a signal to interference and noise ratio (SINR). In another embodiment, the effective normalized rate is represented by:

$$R_{eff} = \frac{R(SNR)}{Price},$$

where $R_{eff}$ is the effective normalized rate, R(SNR) is a function of a signal to noise ratio (SNR), and Price represents the node-selection pricing information. In another embodiment, the method further comprises combining the effective normalized rate with a UE preference, a UE utility, or an operator preference to select the node in the multi-RAT HetNet.

In another embodiment, the effective normalized rate with a UE preference, a UE utility, or an operator preference can be used to select the node in the multi-RAT HetNet. In another embodiment, the selected preference may be maximized by selecting a highest effective normalized data transmission or data reception rate. In another embodiment, a node association may be initiated with the selected node in the multi-RAT HetNet. In one embodiment, the node-selection pricing information is received from a single radio access technology (RAT) in the multi-RAT HetNet. In one embodiment, the node-selection pricing information from a single RAT in the multi-RAT HetNet is determined using a node range extension scheme. In another embodiment, the node range extension scheme may be determined by adding a power offset to a measured signal to noise ratio from a small node. In another embodiment, the effective normalized rate is represented by $R(SNR_{original})$=PowerOffsetdB Price/(1−Price), where $R(SNR_{original})$ is the effective normalized rate, PowerOffsetdB represents a power offset value in decibels, and Price is the node-selection pricing information.

In another embodiment, forming a connection between the UE and a plurality of nodes in the multi-RAT HetNet can be accomplished by determining an optimal node for association. The optimal node for association can be selected by rank ordering the normalized effective rates associated with each node and forming the connection with the plurality of nodes based on the rank ordering.

Figure 10:
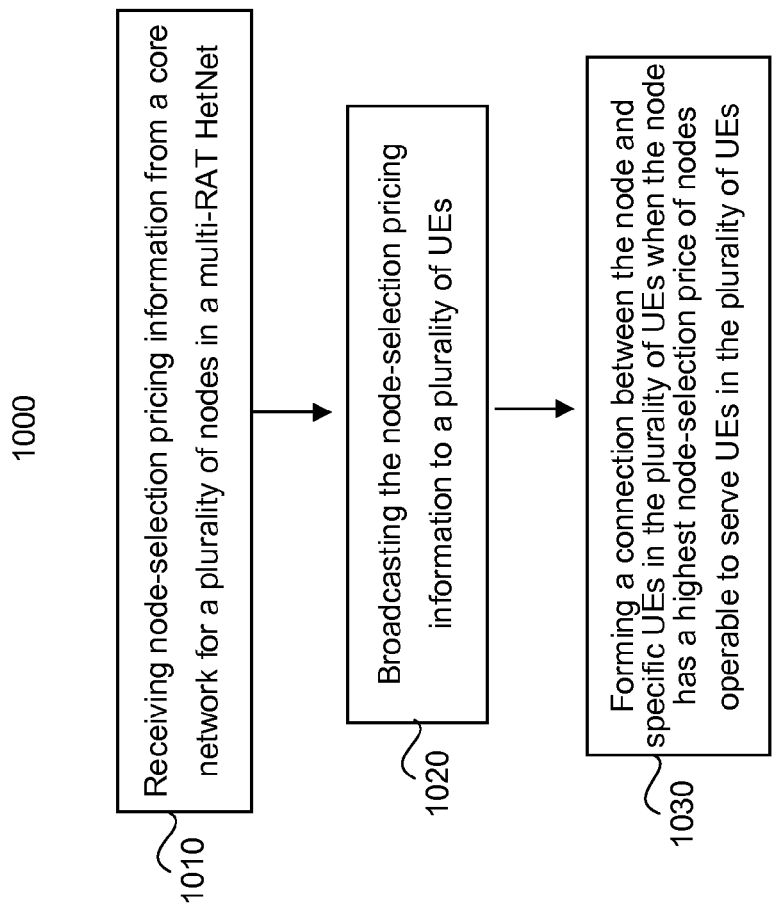
FIG. 10 illustrates a method for providing node-selection pricing information of a node in a HetNet to a UE in accordance with an example.

Another example provides a method 1000 for providing node-selection pricing information of a node in a HetNet to a UE, as shown in the flow chart in FIG. 10. The method includes the operation of computing node-selection pricing information from a core network for a plurality of nodes in a multi-RAT HetNet, as in block 1010. The method also includes broadcasting the node-selection pricing information to a plurality of UEs, as in block 1020. The method also includes forming a connection between the node and specific UEs in the plurality of UEs when the node has a lowest node-selection price of nodes operable to serve UEs in the plurality of UEs, as in block 1030.

In one embodiment, the node-selection pricing information is received from the core network, wherein the core network services access networks comprising of a distributed multi-RAT HetNet, an integrated multi-RAT HetNet, and/or a macro-assisted multi-RAT HetNet. In another embodiment, the node-selection pricing information of nodes in the distributed multiple RAT HetNet is determined based on a signal to noise ratio (SNR) metric or a signal to interference and noise ratio (SINR) metric of the UE, a target load for a node in the multi-RAT HetNet, and an actual load for a node in the multi-RAT HetNet. In another embodiment, the signal to noise ratio (SNR) metric or the signal to interference and noise ratio (SINR) is reported by or measured for UEs. In another embodiment, the signal to noise ratio (SNR) metric or the signal to interference and noise ratio (SINR) is based on metrics such as the aggregate throughput of data between a UE and a node in the multi-RAT HetNet. In another embodiment, the method further comprises computing the node-selection pricing information of each node in the distributed multi-RAT HetNet using 1/(Target Load−Actual Load), where the Target Load is the number of users associated with optimal aggregate throughput for a selected number of users associated with a node in the multi-RAT HetNet, and where the Actual Load represents the actual number of users currently associated with a node in the multi-RAT HetNet or the throughput for the users currently associated with a node in the multi-RAT HetNet.

In another embodiment, the node-selection pricing information of the integrated multiple RAT HetNet is determined based on a node-selection price of a cellular network node in the core network and a price of a node in the core network according to Institute of Electrical and Electronics Engineers (IEEE) 802.11-2012. The cellular network node may include nodes such as a 3GPP LTE Rel. 8, 9, 10, 11, or 12 or IEEE 802.16p, 802.16n, 802.16m-2011, 802.16h-2010, 802.16j-2009, 802.16-2009. In another embodiment, the node-selection pricing information of the integrated multi-RAT HetNet may comprises computing the node-selection pricing information of the cellular network node in the core network as (K−m)/log(K−m) and computing the node-selection pricing information of the Wi-Fi node in the core network as (m/log(m)). In one embodiment, m is an optimal number of users to associate with the Wi-Fi node and K is a number of users in the multi-RAT HetNet, and K−m is a number of users of the cellular network node. In another embodiment, the optimal number of users m to associate with the Wi-Fi node to optimize the overall utility across the Wi-Fi access points and cellular network.

In one embodiment, the UE uses the network selection pricing information to compute the effective data rate. In another embodiment, the UE uses the network selection pricing information to compute other utilities, such as delay or power.

In one embodiment, the network selection pricing information may be computed for a single RAT HetNet. A single RAT HetNet may use node range extension to bias association towards small nodes. In one embodiment, the UE uses a fixed or per node power offset added to the SNR measured from the small node tier. When fixed or per node power offset is positive, the UE will artificially associate with the tier of small nodes. The node range extension scheme may also be cast as a pricing mechanism by which the price of the small node tier is lowered for better load balancing. In one embodiment, instead of broadcasting a power offset, the network/small node or cell may broadcast a price between zero and one (0<Price<1) that may inflate the perceived or normalized rates associated with the node or cell.

In another embodiment, the network selection price may be computed where the effective normalized rate of the network selection pricing based method equals the SNR offset based biasing method. For example, if R≈log(SNR), then solving the following equation will yield the same effective rate as the power offset based bias: $R(SNR_{original})$=PowerOffsetdB Price/(1−Price), where $R(SNR_{original})$ is the effective normalized rate, PowerOffsetdB represents a power offset value in decibels, and Price is the node-selection pricing information. In this example, if the network selection price increases beyond 1, the UEs can be directed to associate with the macro node.

In one embodiment, the network selection pricing information may be computed for distributed multi-RAT HetNets. In one embodiment, computation of the network selection price in a distributed multi-RAT framework depends on the level of cooperation available across the targeted nodes or nodes. In another embodiment, UE assistance may be used to compute a price per node that achieves better load balancing across nodes. In the absence of any cooperation, each node may simply broadcast the current network load on the node or cell, which could help the UE assess their throughput on the targeted nodes or nodes. In this example, the price for each node or cell would equal the current number of users associated with each node or cell. In this example, the computation scheme does not always yield good performance unless used with additional control mechanisms.

In another example, a simple heuristic may be used to improve performance bases on competitive pricing within nodes. In this example, each node or cell collects SNR/SINR metrics from prospective users. A target load for each node or cell can be computed based on the SNR/SINR metrics the base station projects the best aggregate throughput (or alternate metrics) if the K most desirable users associated with the node.

The node or cell then broadcasts a price which is computed as 1/(Target Load−Actual Load) on the node or cell. In one embodiment, the Target Load is an optimal number of users corresponding to the optimal aggregate throughput for a selected number of users associated with a node in the multi-RAT HetNet, and where the Actual Load represents the actual number of users currently associated with a node in the multi-RAT HetNet. In this case, the probability of a UE selecting a node goes down as the actual load approaches the target load.

In one embodiment, the network selection pricing information may be computed for integrated Multi-RAT HetNets. In one embodiment, once the UE associates with an integrated small node or cell, the proportional fair (prop-fair) throughput maximizing assignment of users across the WiFi and the LTE RATs satisfies the following conditions for users assigned to a WiFi $$RAT \cdot \frac{\bar{R}_{,LTE}}{c(K-m)} < \frac{\bar{R}_{,WiFi}}{c(m)}$$

In this embodiment, $\bar{R}$ is the average rate of a user over the WiFi or LTE link, $c(K-m)=m/\log(m)$, where m is the optimal number of users that can be assigned or associated to WiFi and K is a selected or defined constant. In one example, m is computed based on full knowledge of UE rates across both WLAN and 3GPP interfaces, assuming full cooperation across RATs on a small node or cell. In one embodiment, the node price for a WiFi node or cell is computed as $(m/\log(m))$ and for a LTE node or cell is computed as $(K-m)/\log(K-m)$. In one embodiment, the rate shown can be the normalized rate computed after node-range extension has been performed, to steer UEs to integrated small node. Accordingly in this embodiment, the effective network selection price is the product of the WLAN and 3GPP node or cell network selection prices. In one embodiment, a WLAN and a 3GPP node or cell may be co-located to enable computing optimal network selection pricing.

In one embodiment, the network selection pricing information may be computed for macro-assisted multi-RAT HetNets. In one embodiment, full cooperation with centralized macro-assisted HetNets results in network selection pricing that may yield optimal node association. In one embodiment, the network selection pricing is solved by using a Lagrange multiplier to maximize the aggregate throughout or minimum throughput across users in the system. In one embodiment, for Maximizing sum log throughput in a static network (Resource-Fair), an optimization problem may be:

$$\max U^{sys} = \sum_{i=1}^{N} \log TP_i \quad \text{s.t} \sum_{k=1}^{K} \sum_{r=1}^{r_k} x_{i,(k,r)} R_{i,(k,r)} = TP_i, \forall i.; \text{and}$$

$$0 \leq x_{i,(k,r)} \leq 1, \forall i, (k, r).$$

The Lagrange dual $$\max \sum_{i} \log \mu_i + N - \sum_{k=1}^{K} \sum_{r=1}^{r_k} \lambda_{(k,r)} \quad \text{s.t.} \quad \lambda_{(k,r)} \geq u_i R_{i,(k,r)}, \forall i, (k, r); \text{and}$$

$$u_i > 0 \ \forall i,$$

where $\lambda_{(k,r)}$ is the Lagrange multiplier corresponding to the constraint $$\sum_{i} x_{i,(k,r)} \leq 1,$$

and $u_i$ is the Lagrange multiplier corresponding to the constraint $$\sum_{k=1}^{K} \sum_{r=1}^{r_k} x_{i,(k,r)} R_{i,(k,r)} \geq R_{min}, \text{ and } \sum_{k=1}^{K} \sum_{r=1}^{r_k} x_{i,(k,r)} R_{i,(k,r)} = TP_i.$$

In one embodiment, for Maximizing the Minimum per User throughput in a static network (Rate-Fair), an optimization problem may be:

$$\max R_{min} \quad \text{s.t.} \sum_{k=1}^{K} \sum_{r=1}^{r_k} x_{i,(k,r)} R_{i,(k,r)} \geq R_{min},$$

$$\forall i; \sum_{i} x_{i,(k,r)} \leq 1, \forall i, (k, r); \text{ and}$$

$$0 \leq x_{i,(k,r)} \leq 1, \forall i, (k, r).$$

The Lagrange dual problem is $$\sum_{k=1}^{K} \sum_{r=1}^{r_k} \lambda_{(k,r)} \quad \text{s.t.} \sum_{i} \mu_i = 1; \lambda_{(k,r)} \geq \mu_i R_{i,(k,r)}, \forall i, (k, r); \text{and}$$

$$\mu_i \geq 0, \lambda_{(k,r)} \geq 0, \forall i, (k, r),$$

where $\lambda_{(k,r)}$ is the Lagrange multiplier corresponding to the constraint $$\sum_i x_{i,(k,r)} \leq 1,$$

and $u_i$ is the Lagrange multiplier corresponding to the constraint $$\sum_{k=1}^{K} \sum_{r=1}^{r_k} x_{i,(k,r)} R_{i,(k,r)} \geq R_{min}.$$

In one embodiment, the network selection price per node or cell is the Lagrange multiplier associated with each node. In another embodiment the node-selection pricing information of the macro-assisted multi-RAT HetNet comprises arranging the nodes according to a macro-assisted multi-RAT Het-Net architecture and computing the node-selection price information using a Lagrange multiplier at a centralized node. In one embodiment, the macro-assisted multi-RAT Het-Net architecture comprises one or more anchor nodes and one or more multi-RAT small cell nodes.

In one embodiment, the network selection pricing information may be computed using multi-homing/multi-node selection. In one embodiment, the pricing framework for the single-RAT HetNets, the distributed multi-RAT HetNets, integrated multi-RAT HetNets, and the macro-assisted multi-RAT HetNets can be used to compute the network selection pricing and for a UE to associate with more than one node simultaneously. In one embodiment, the UE can rank order the normalized effective rates associated with each node or cell to choose a selected or defined number of optimal nodes for association.

In another embodiment, in computing the network selection pricing for HetNets, such as the single-RAT HetNets, the distributed multi-RAT HetNets, integrated multi-RAT HetNets, and the macro-assisted multi-RAT HetNets, the network selection pricing may be used to compute the normalized rate metrics or utility metrics, such as network delay, power, quality of service, etc. In one embodiment, the UE may combine the network pricing information with other metrics such as UE or operator preference for final node, node, or RAT selection.

In one embodiment, other price calculations may be computed such as competitive pricing in a multi-operator network. In another embodiment, core network or application based network selection pricing is computed. In one example, the user pays a penalty for sending more data in a cellular network.

In one embodiment, the RATs used may include a multiple different RATs, such as 3GPP RATs, WLAN RATs, mm-wave RATs, D2D RATs, 60 GHz RATs, etc. In another embodiment, the cellular network may be a 3GPP LTE Rel. 8, 9, 10, 11, or 12 or IEEE 802.16p, 802.16n, 802.16m-2011, 802.16h-2010, 802.16j-2009, 802.16-2009.

Figure 11:
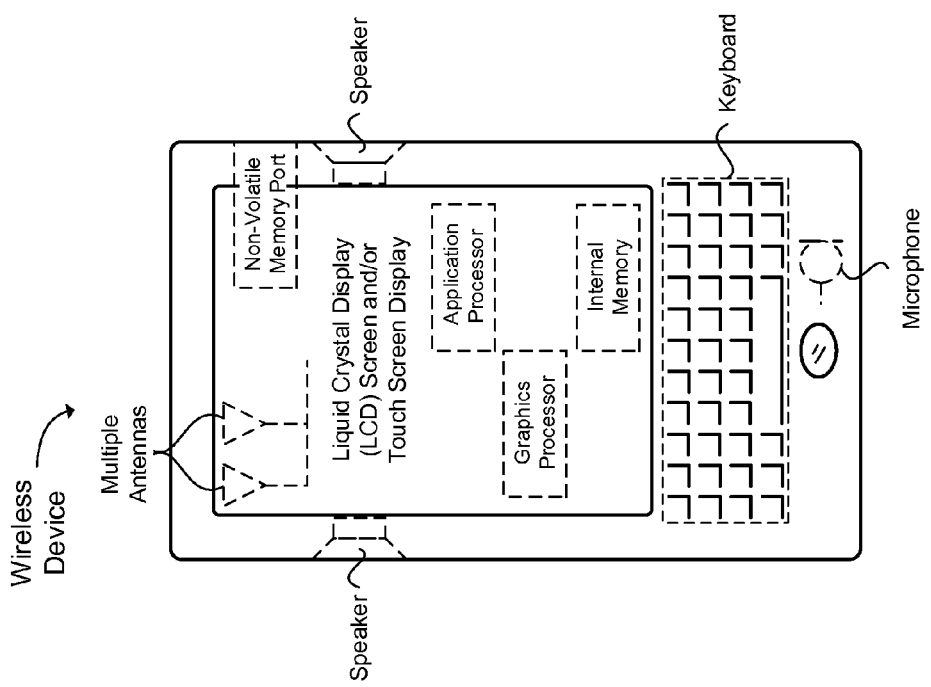
FIG. 11 illustrates a diagram of a user equipment (UE) in accordance with an example.

FIG. 11 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) is configured to select a node in a multiple radio access technology (multi-RAT) heterogeneous network (HetNet), the UE having computer circuitry configured to:
   receive node-selection pricing information from a plurality of nodes in the multi-RAT HetNet;
   determine an effective normalized rate for the plurality of nodes in the multi-RAT HetNet using the node-selection pricing information, wherein the effective normalized rate is represented by:

$$R_{eff} = \frac{R(SNR)}{Price},$$

where $R_{eff}$ is the effective normalized rate, R(SNR) is a function of a signal to noise ratio (SNR), and Price represents the node-selection pricing information; and select a node to communicate with in the multi-RAT HetNet to maximize a selected preference based on the effective normalized rate.

2. The computer circuitry of claim 1, wherein the selected preference is one of an effective data rate, a delay, a power level, a throughput, a quality of service, a power efficiency, a data transmission rate for the UE to communicate with the selected node in the multi-RAT HetNet.

3. The computer circuitry of claim 1, wherein the selected preference is computed as a function of the node-selection pricing information.

4. The computer circuitry of claim 1, wherein the selected preference is an effective utility that is represented by:
   $U_{eff}=f(U_{user}, U_{operator},$ Network price), where $U_{eff}$ is the effective utility, $u_{user}$ is a utility to a user, $u_{operator}$ is a utility to an operator, and Network Price is the node-selection pricing information.

5. A method for a user equipment (UE) selecting a heterogeneous network (HetNet) node in a multiple radio access technology (multi-RAT) HetNet, the method comprising:
   receiving node-selection pricing information from a plurality of nodes in the multi-RAT HetNet;
   determining an effective normalized rate for the plurality of nodes using the node-selection pricing information, wherein the effective normalized rate is represented by:

$$R_{eff} = \frac{R(SNR)}{Price},$$

where $R_{eff}$ is the effective normalized rate, R(SNR) is a function of a signal to noise ratio (SNR), and Price represents the node-selection pricing information; and
   selecting a node in the multi-RAT HetNet using the node-selection pricing information to maximize a selected preference relative to the effective normalized rate.

6. The method of claim 5, further comprising combining the effective normalized rate with a UE preference, a UE utility, or an operator preference to select the node in the multi-RAT HetNet.

7. The method of claim 5, further comprising maximizing the selected preference by selecting a highest effective normalized data transmission or data reception rate.

8. The method of claim 5, further comprising initiating a node association with the selected node in the multi-RAT HetNet.

9. The method of claim 5, further comprising receiving the node-selection pricing information from a single radio access technology (RAT) in the multi-RAT HetNet.

10. The method of claim 9, wherein the node-selection pricing information from the single RAT in the multi-RAT HetNet is determined using a node range extension scheme.

11. The method of claim 10, wherein the effective normalized rate is represented by $R(SNR_{original})$=PowerOffsetdB price/(1-Price), where $R(SNR_{original})$ is the effective normalized rate, PowerOffsetdB represents a power offset value in decibels, and Price is the node-selection pricing information.

12. The method of claim 5, further comprising forming a connection between the UE and one of a plurality of nodes in the multi-RAT HetNet by:
   determining an optimal node for association by rank ordering the normalized effective rates associated with each node; and forming the connection with the one of the plurality of nodes based on the rank ordering.

\* \* \* \* \*